United States Patent
Meyer

(10) Patent No.: US 10,633,053 B1
(45) Date of Patent: Apr. 28, 2020

(54) AXLE ARRANGEMENT FOR A BICYCLE

(71) Applicant: Kurt Manufacturing Company, Inc., Minneapolis, MN (US)

(72) Inventor: Bradd R. Meyer, Brooklyn Park, MN (US)

(73) Assignee: Kurt Manufacturing Company, Inc., Minneapolis, MN (US)

( * ) Notice: Subject to any disclaimer, the term of this patent is extended or adjusted under 35 U.S.C. 154(b) by 199 days.

(21) Appl. No.: 15/487,247

(22) Filed: Apr. 13, 2017

Related U.S. Application Data

(63) Continuation-in-part of application No. 14/155,609, filed on Jan. 15, 2014, now abandoned, which is a continuation-in-part of application No. 13/832,544, filed on Mar. 15, 2013, now Pat. No. 9,656,719.

(51) Int. Cl.
*B62K 25/02* (2006.01)
*B60B 35/00* (2006.01)
*B60B 27/02* (2006.01)

(52) U.S. Cl.
CPC ............ *B62K 25/02* (2013.01); *B60B 35/004* (2013.01); *B60B 27/023* (2013.01)

(58) Field of Classification Search
CPC .. B62K 25/02; B62K 2206/00; B60B 27/023; B60B 27/026; B60B 35/00; B60B 35/04; B60B 35/004; B60B 35/08; B60B 35/02; B60B 35/025
See application file for complete search history.

(56) References Cited

U.S. PATENT DOCUMENTS

| | | |
|---|---|---|
| 579,893 A | 3/1897 | Osmond |
| 605,870 A | 6/1898 | Gubelmann |
| 606,217 A | 6/1898 | Hoffman |
| 632,711 A | 9/1899 | Ganswindt |
| 3,807,761 A | 4/1974 | Brilando |
| 4,400,038 A | 8/1983 | Hosokawa |
| 4,405,180 A | 9/1983 | Butz |
| 4,412,706 A | 11/1983 | Hopper, Jr. |
| 4,424,981 A | 1/1984 | Maxwell |
| D315,122 S | 3/1991 | Schramm |
| 5,215,324 A | 6/1993 | Kawai |
| 5,284,383 A | 2/1994 | Lehanneur |
| 5,301,778 A | 4/1994 | Haeussinger |

(Continued)

FOREIGN PATENT DOCUMENTS

| | | |
|---|---|---|
| GB | 491924 A | 9/1938 |
| WO | 9503861 A1 | 2/1995 |
| WO | 2009006559 A1 | 1/2009 |

OTHER PUBLICATIONS

"Tech Speak: 142×12, What's the Big Idea?" written by Zach Overholt, published on Feb. 7, 2011 on BikeRumor.com, http://www.bikerumor.com/2011/02/07/tech-speak-142×12-whats-the-big-idea/.

*Primary Examiner* — Jason R Bellinger

(74) *Attorney, Agent, or Firm* — Steven M. Koehler; Westman, Champlin & Koehler, P.A.

(57) ABSTRACT

An axle arrangement for a rear hub of a bicycle includes an axle skewer having at a first end threads formed on an outer surface thereof, and at a second end remote from the first end, an enlarged head having an annular surface facing the first end. An element has threads to threadably engage the axle shaft at the first end. Each of the enlarged end and the element are configured with surfaces so as to be fixably secured to couplers of a bicycle trainer.

25 Claims, 6 Drawing Sheets

(56) References Cited

U.S. PATENT DOCUMENTS

| | | | |
|---|---|---|---|
| 5,382,716 | A | 1/1995 | Stewart |
| 5,494,390 | A | 2/1996 | Gonzalez |
| 5,567,020 | A | 10/1996 | Phillips |
| 6,241,322 | B1 | 6/2001 | Phillips |
| 6,260,931 | B1 | 7/2001 | Stewart |
| 6,886,894 | B2 | 5/2005 | Kanehisa |
| 7,166,054 | B2 | 1/2007 | Urabe |
| RE39,528 | E | 3/2007 | Kanehisa |
| D545,184 | S | 6/2007 | Hanamura |
| 7,537,291 | B2 | 5/2009 | Hara |
| 7,581,795 | B1 | 9/2009 | Chen |
| 7,607,507 | B2 | 10/2009 | Lane |
| 7,673,947 | B2 | 3/2010 | Chang |
| 7,731,428 | B2 | 6/2010 | Kuan |
| 7,946,659 | B2 | 5/2011 | Graetz |
| 8,573,878 | B2 | 11/2013 | Chang |
| 8,573,879 | B2 | 11/2013 | Chang |
| 8,684,243 | B1 | 4/2014 | Baumann |
| 9,656,719 | B1 * | 5/2017 | Meyers ................ B60B 35/004 |
| 2004/0183361 | A1 | 9/2004 | Chen |
| 2008/0185907 | A1 | 8/2008 | Hara |
| 2008/0197602 | A1 | 8/2008 | Watarai |
| 2008/0284127 | A1 | 11/2008 | Watarai |
| 2009/0243255 | A1 | 10/2009 | Ashman |
| 2011/0259658 | A1 | 10/2011 | Huang |
| 2013/0241175 | A1 | 9/2013 | Talavasek |
| 2013/0328385 | A1 | 12/2013 | Kuo |
| 2015/0054254 | A1 | 2/2015 | Spahr |
| 2015/0069827 | A1 | 3/2015 | Nakajima |

\* cited by examiner

AXLE ARRANGEMENT FOR A BICYCLE

CROSS-REFERENCE TO RELATED APPLICATIONS

This application is a continuation-in-part of Ser. No. 14/155,609, filed Jan. 15, 2014, abandoned, which is a continuation-in-part of application Ser. No. 13/832,544, filed Mar. 15, 2013, granted as U.S. Pat. No. 9,656,719B1, both of which are incorporated herein by reference.

BACKGROUND

The discussion below is merely provided for general background information and is not intended to be used as an aid in determining the scope of the claimed subject matter.

Thru axles are now being used to fasten the rear wheel assembly to a bicycle and are of size and length to be inserted through apertures in the rear forks as well as through the hub assembly of the rear wheel. Upon insertion of the thru axle through the hub assembly, threads provided on the end of the axle are threaded into one of the rear forks. A head at the other end of the axle includes a recess, for a tool such as an Allen wrench is used to turn the axle. The head engages the other rear fork on the bicycle. For some manufactures, the design and length of the axle is such that neither side when finally mounted to the bicycle has an exposed portion, or much of an exposed portion beyond the outwardly facing surfaces of the forks.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A first aspect is an axle arrangement for a rear hub of a bicycle that includes an axle skewer having at a first end threads formed on an outer surface thereof configured to theadably engage a frame fork of a bicycle, and at a second end remote from the first end, an enlarged head having an annular surface facing the first end. An element has threads to threadably engage the axle shaft at the first end. Each of the enlarged end and the element are configured with surfaces so as to be fixably secured to couplers of a bicycle trainer.

A second aspect is a kit that includes the above-mentioned axle arrangement and two or more of a spacer and/or an adapter wherein each of said spacers and/or adapters are separately configured to adapt the axle arrangement to a different manufacturer of a bicycle.

A third aspect is an axle arrangement for a bicycle that includes an axle skewer having at a first end threads formed on an outer surface thereof configured to theadably engage a frame fork of a bicycle. A fastener is configured to be secured to the axle skewer, the fastener is configured to attach a device to the axle skewer.

DETAILED DESCRIPTION OF ILLUSTRATIVE EMBODIMENTS

Although the thru axle allows mounting of the rear to the bicycle, the lack of or minimal exposure of end portions inhibits use of the bicycle on a bicycle trainer.

Figure 5:
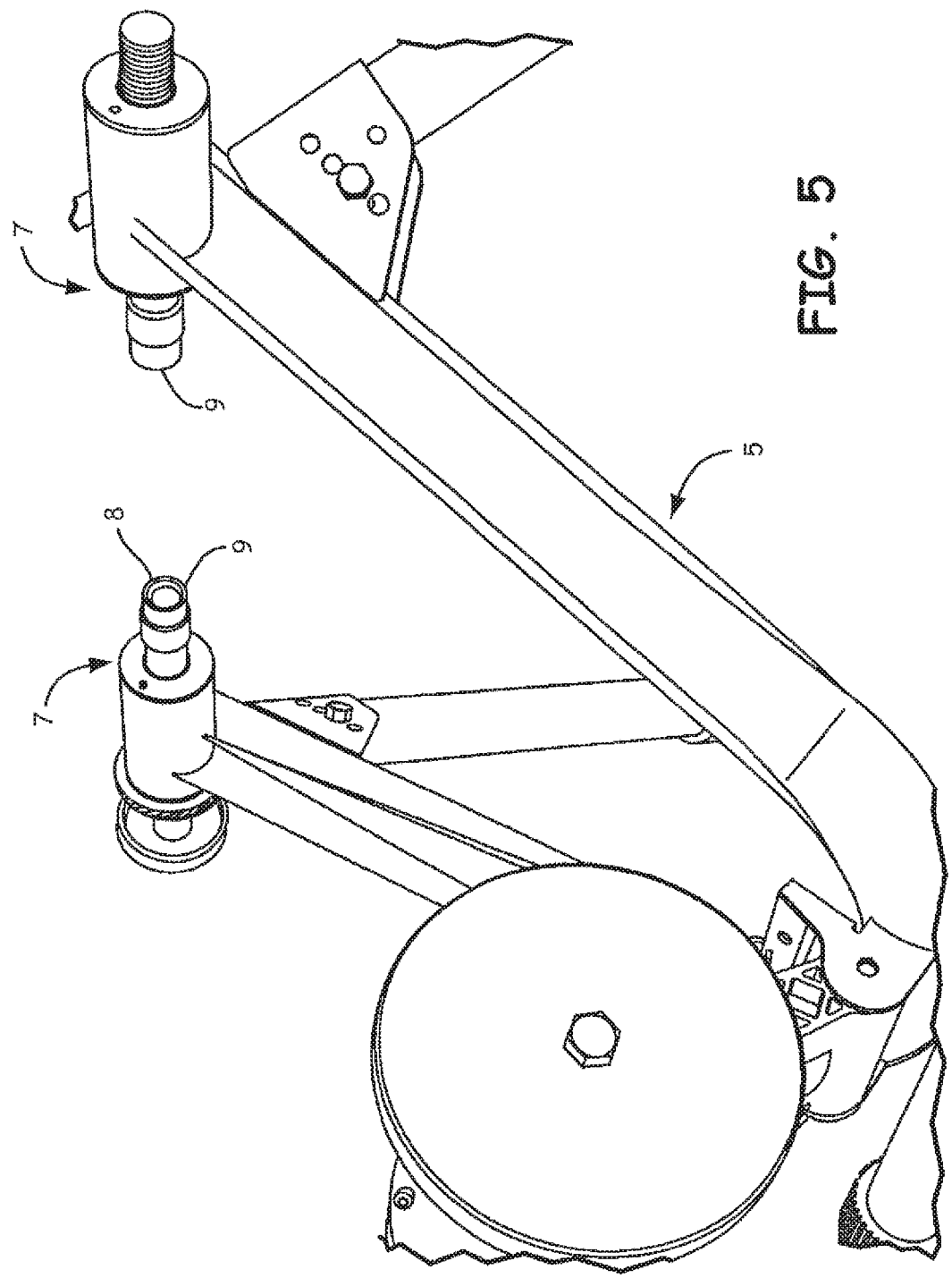
FIG. 5 is a perspective view of a portion of a bicycle trainer.

An axle arrangement 10 to overcome this problem is illustrated in the figures and includes a thru axle skewer 12 having ends 14 and 16 configured for attachment to couplers of a bicycle trainer. Such couplers are well known. FIG. 5 illustrates a portion of a bicycle trainer 5 having such couplers indicated at 7. Each coupler 7 has a recess 8 (typically a cylindrical bore) formed or defined by a perimeter wall 9.

Figure 3:
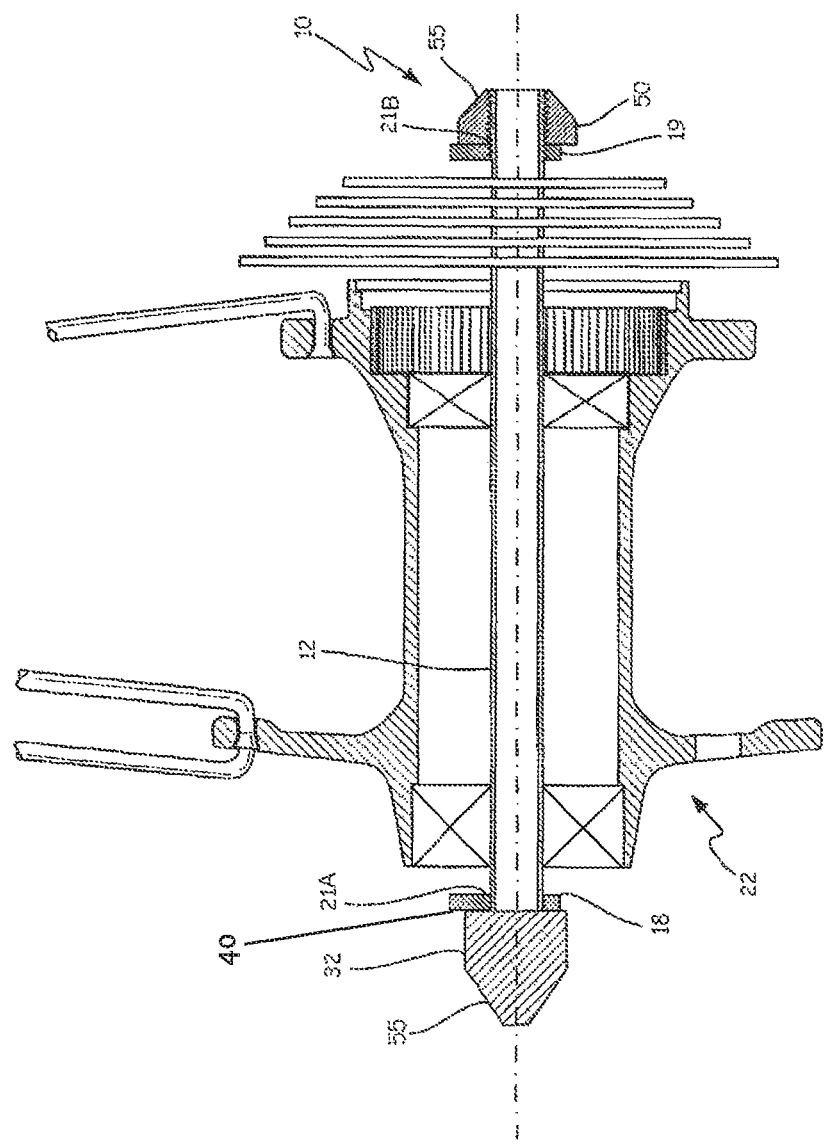
FIG. 3 is a sectional view of a rear wheel of a bicycle with the axle arrangement.
Figure 4:
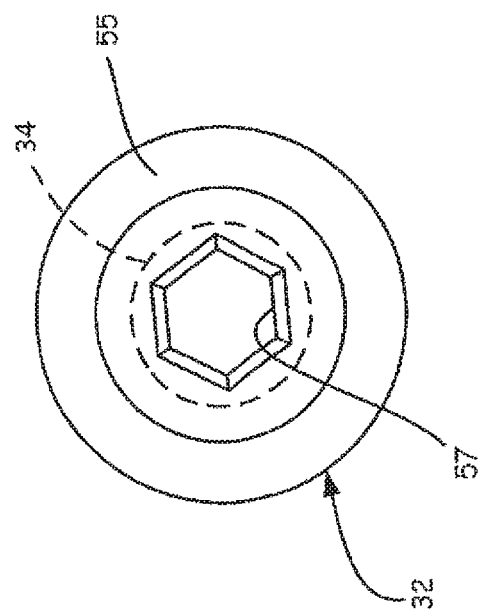
FIG. 4 is an end view of an axle skewer.

In FIG. 3 a hub assembly 22 of a bicycle is schematically illustrated with axle arrangement 10. Typically, receiving ends 18 and 19 of forks (not otherwise illustrated) are called dropout ends. The axle 12 has a shaft diameter suitable for insertion through apertures 21A, 21B in the dropout ends 18,19 of the forks as well as through a hub assembly 22 of a bicycle rear wheel.

At a first end 30 of the axle 12, an enlarged head 32 is fixably secured to the axle shaft 34 to form an integral structure in a manner that typically prevents rotation of the enlarged head 32 separate from the axle shaft 34. The enlarged head 32 includes an extending annular flange 36 about the axle shaft 34 which contacts an outwardly facing surface 40 of one of the dropout ends 18,19 (herein 18) when the axle shaft 34 is inserted through the aperture 21A and into the hub assembly 22.

At the other end 42 remote from the enlarged head 32, threads 46 are provided on an outer surface. As discussed in the background section, one of the apertures 21A, 21B of such bicycles includes threads, herein aperture 21B, to which axle 12 threadably mates. The threads 46 of the shaft 34 extend through and outwardly from the aperture 21B of the other drop out end of the fork 19.

An element herein exemplified by a nut 50 threadably mates with the second end 42 of the axle 12 on the portion extending outwardly from the aperture 21B of the drop out end 19. The nut 50 includes an enlarged annular flange 52 that contacts the outwardly facing surface of the second drop out end 19 of the forks when the nut 50 threadably mates with the threads 46 of the axle shaft 34. Like the enlarged head 32, the element or nut 50 is configured so as to form a secure engagement with a coupler of a bicycle trainer. In the exemplary embodiment illustrated, which should not be considered limiting, both the enlarged head 32 and the nut 50 include a tapered or conical annular surface 55a and 56b, respectively, extending outwardly away from the forks configured to be at least partially in each corresponding recess 8. Stated another way, each of the enlarged head 32 and the nut 50 have oppositely facing conical annular surfaces 55a and 56b, respectively, when the nut 50 is threaded upon the skewer, where each of the conical annular surfaces 55a,56b has cross section therethrough reducing in a direction away from the other conical annular surface 55a,56b. Suitable surfaces are provided on the enlarged head 32 and on the element or nut 50 to allow tightening of the element or nut 50 on the axle shaft 34 when the axle shaft 34 is maintained (herein via enlarged head 32) in a stationary position. In the embodiment illustrated, the suitable surfaces of the enlarged head 32 are configured so as to provide a recess 57 suitable for an Allen wrench. On the nut 50, the suitable surfaces are spaced apart flat surfaces 59 on the flange 52. It should be understood, the suitable surfaces herein illustrated are advantageous but exemplary in that other suitable surfaces can be used.

Figure 1:
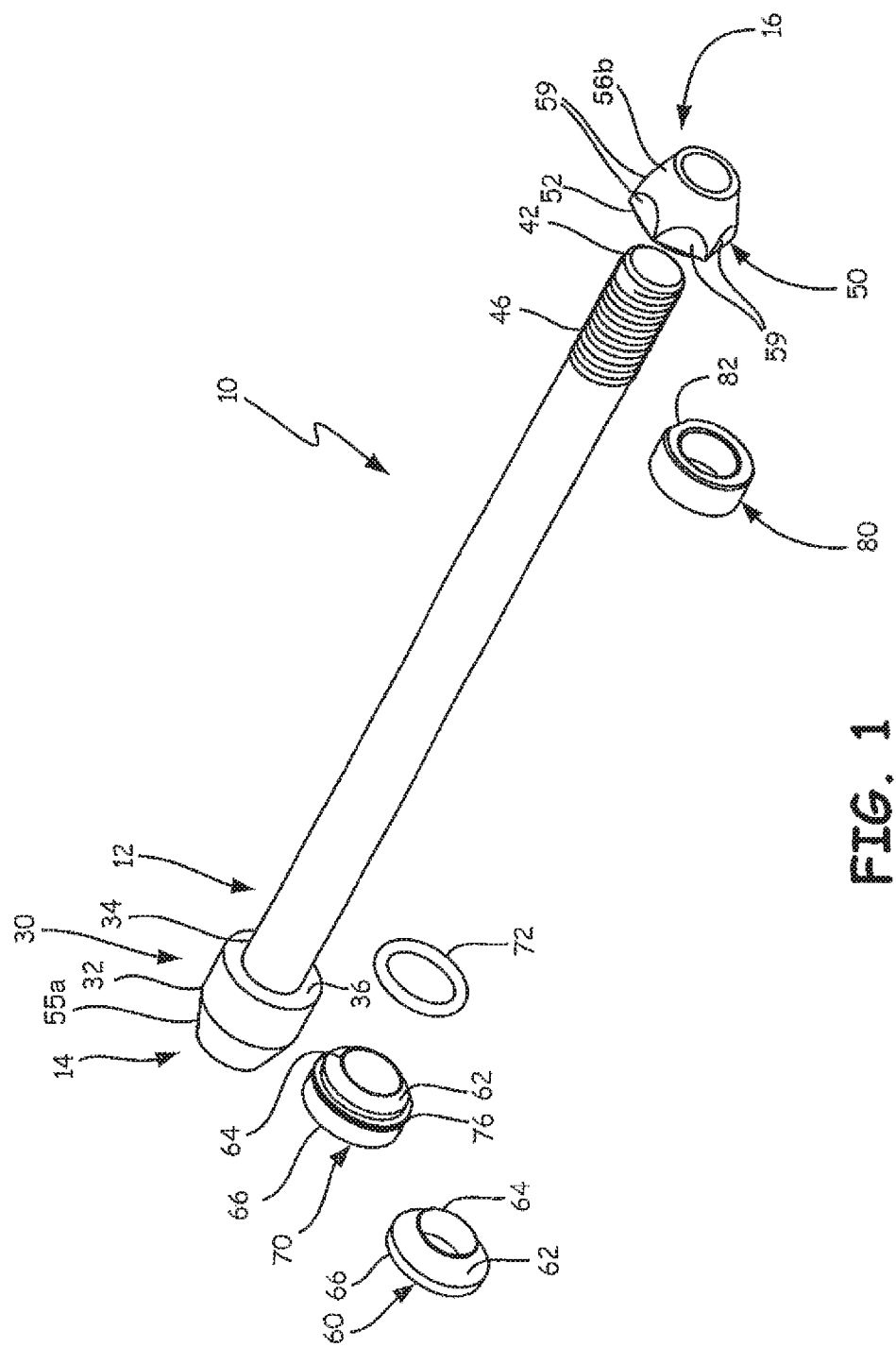
FIG. 1 is a perspective view of an axle arrangement with adapters and a spacer.

In a particularly advantageous embodiment, the length of the axle shaft 34 is of sufficient length to be used on a plurality of bicycles sold by different manufacturers. Depending on the manufacturer, spacers and/or other adapters each of which having an aperture through which the axle shaft 34 can extend therethrough are provided. In a first embodiment, an adapter 60 includes a conical surface 62. The conically shaped adapter 60 has an aperture 64 through which the shaft 34 can extend. On an end of the adapter 60 opposite the conical surface 62 an enlarged end surface 66 that engages, herein the annular flange 36 of the enlarged head 32. Since the conical surface 62 of the adapter 60 engages edges of the aperture 21A, the adapter 60 centers the shaft 34 in the aperture 21A. Two such adapters are illustrated in FIG. 1 at 60 and 70. Adapter 70 also includes the conical surface 62, aperture 64 and enlarged end surface 66, but further includes a flexible ring 72 that encircles the adapter 70, being disposed in an annular groove 76 provided therein. The flexible ring 72 also aids in centering the shaft 34 in the aperture 21A.

A cylindrical spacer 80 is provided and configured so as to configure the thru axle 12 for use on a bicycle of yet a different manufacturer. The spacer 80 herein by example is disposed at the end 42, and in particular between an outwardly facing surface of the drop out end 19 of the forks and the annular flange 52 of the nut 50. The spacer 80 encircles some of the threads 46 of the shaft 34 and has a longitudinal length so as to fill the space between the outwardly facing surface of the drop out end 19 of the forks and the annular flange 52 of the nut 50, while allowing the nut 50 to be securely attached to the remaining exposed threads 46 of the shaft 34. The spacer 80 can include a flat surface 82 on the circumference configured to correspond to and engage a corresponding flat surface provided on the drop out end 19 of the fork. Spacer 90 (is similar to spacer 80 but has a different longitudinal length and herein is mounted on the end 30.

In one embodiment, the axle skewer 12, nut 50 and two or more spacers 80,90 and/or adapters 60,70 can be sold as a kit thereby allowing a single product to accommodate a plurality of different bicycle manufacturers.

Figure 6:
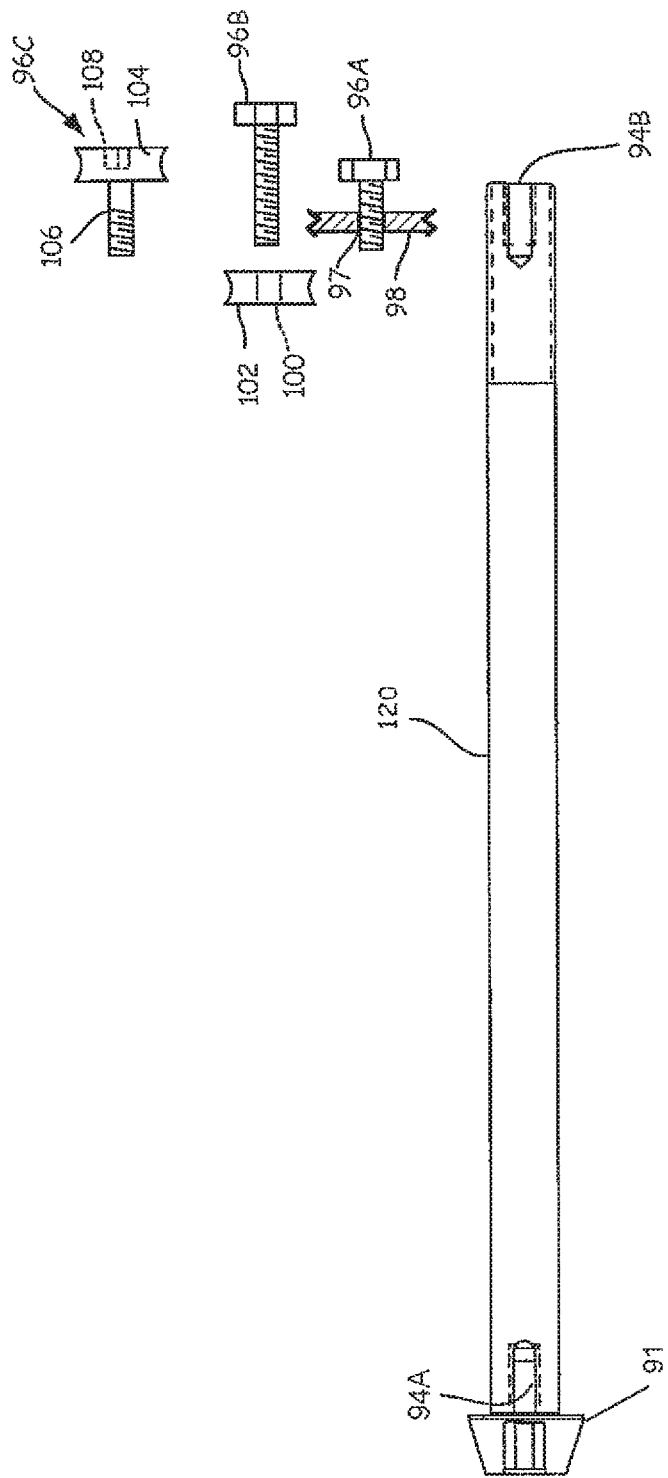
FIG. 6 is a side elevational view of a second embodiment of an axle arrangement.

FIG. 6 illustrates the axle skewer 120 having internal aperture 94A and 94B, for example threaded, each aperture 94A, 94B of which can receive another fastener, herein exemplified by fasteners 96A, 96B and 96C (shown only on one side of the skewer 120, but it is to be understood such fasteners can be used with one or both apertures 94A, 94B). The apertures 94A, 94B extend inwardly from each of opposite end surfaces of the skewer 120 and can be along the longitudinal axis of the skewer 120. The additional fastener such as fastener 96A allows other elements to be mounted to the bicycle. With bicycles made of carbon fiber frames, mounting of elements such as fenders, saddle bag holders, racks, trailers to the bicycle is difficult because it is not desirable to drill holes or attach clamps to the carbon fiber frame. It has been discovered that the axle skewer 120 can provide a secure and stable mount for such elements. In FIG. 6, a removable head 91 threadably mates to shaft 34 with aperture 94A, however this should not be considered limiting in that head 91 could be formed integral with shaft 34 from a single unitary body.

In the illustrated examples, fastener 96A comprises a bolt with threads that mate with the internal threads of the apertures 94A or 94B. Such a fastener can be useful for example in mounting any element, such as but not limited to a fender, bag holder, rack, etc. that includes a bore 97 though a mounting flange illustrated at 98.

Fastener 96B is similar to fastener 96A but is of suitable length to extend through a bore 100 in an adapter 102. Adapter 102 can take any number of shapes and exemplifies an element to which another element can be selectively connected thereto. For example and without limitation, adapter 102 can be of shape suitable for forming a secure connection with a trailer (not shown) that can be towed by the bicyclist. The adapter 102 could also be of shape to allow a fender, saddle bag holder or the like to be quickly attached to the bicycle. It is to be understood that the shape of the adapter 102 in FIG. 6 is but one exemplary shape and should not be considered limiting.

Fastener 96C comprises an adapter 104 having a threaded shaft 106 that threadably mates with apertures 94A or 94B. Adapter 104 is similar in form and function to adapter 102 in that it allows other elements to be connected thereto. Adapter 104 however includes shaft 106 fixedly secured thereto and can include internal surfaces 108 and/or external surfaces (not shown) that allow the adapter 104 to be securely threaded into the aperture 94A or 94B with a suitable tool (not shown). The fasteners 96A, 96B or 96C along with the mounting flanges 98 or other elements connected to the fasteners 96B or 96C can be configured so as not to interfere with the function of nut 50 or end 32 used to provide ends suitable for coupling with the trainer. However, it should be noted the apertures 94A, 94B and fasteners 96A, 96B and 96C are not limited to an axle also configured to be removably secured to a bicycle trainer, but also can be used with axle skewers (front or rear) that are not removably secured to a bicycle trainer.

Figure 2:
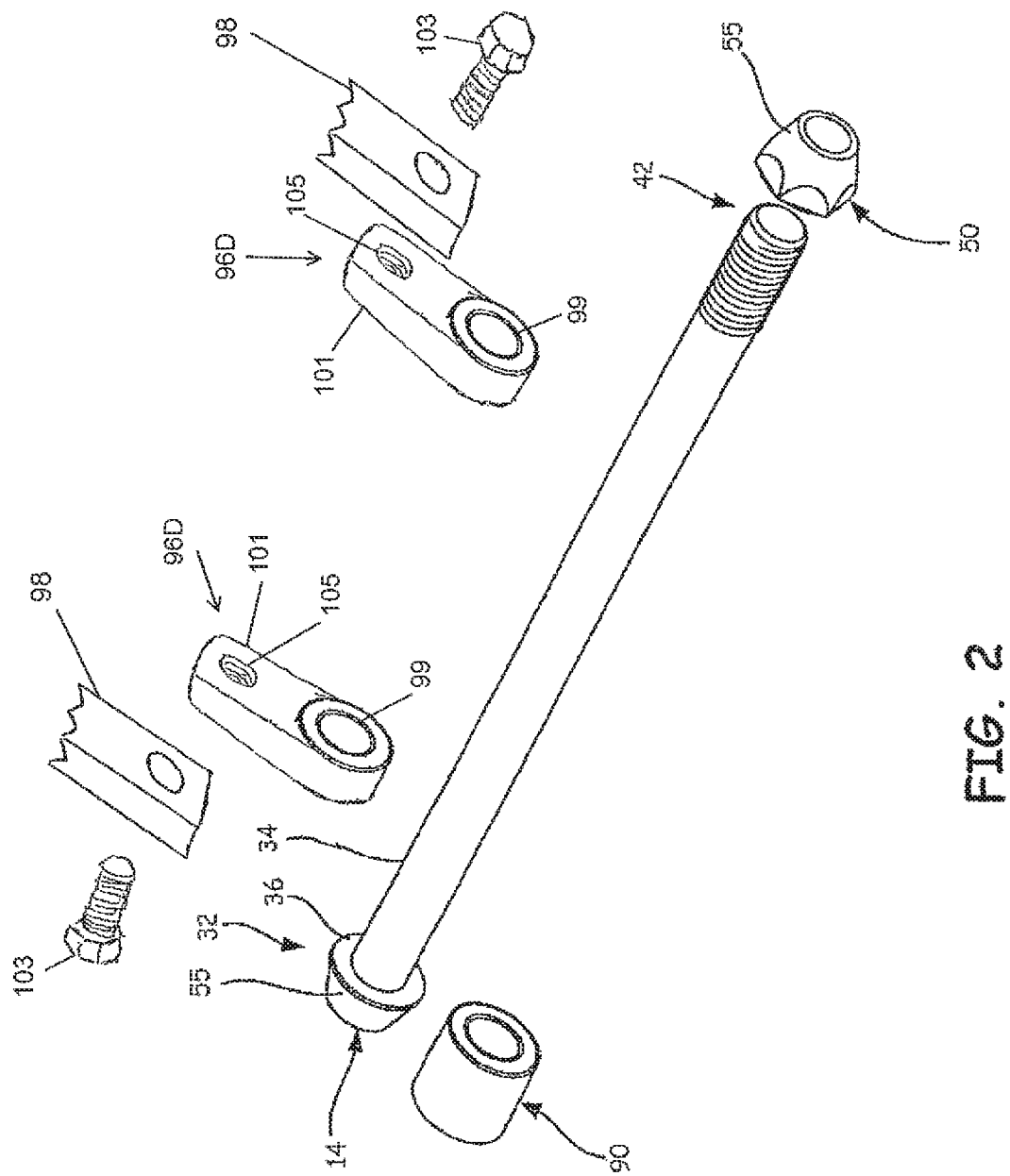
FIG. 2 is a perspective view of the axle arrangement with another spacer.

Yet another type of fastener is illustrated at 96D in FIG. 2, although it should be understood that the fastener 96D can be used on any of the embodiments herein. Fastener 96D includes a body having a first aperture 99 of size to receive axle shaft 34. A portion 101 of the fastener 96D remote from aperture 99 is configured to provide a mount for any element, such as but not limited to a fender, bag holder, rack, etc. to be supported by the axle skewer 12. In one embodiment, the portion 101 can be disposed asymmetrically with respect to the aperture 99, or a center axis thereof, herein extending radially in one direction from the aperture 99. In the embodiment illustrated, the mount includes a threaded bolt 103 that extends through an aperture of the element herein by way of example mounting flanges 98. The bolt 103 is received in a second aperture 105 of the fastener 98D located in the portion 101. It should be understood that the mount herein using a threaded bolt and aperture is but one exemplary form. Other suitable mounts could include aperture 105 not having threads wherein the mount comprises the threaded bolt 103 secured with a suitable nut. In addition, the mount on portion 99 could be configured to receive a clip, clasp or other fastening device as desired. As with the fasteners 96A-96C, depending on the element to be secured to the shaft 34 a single fastener 96D can be used or a pair as shown. As indicated above, fasteners can be mounted to the axle skewer 12 and in particular to shaft 34, while not interfering with mounting of the bicycle to the trainer using the opposed ends of the axle skewer 12 herein exemplified by the presence of end 32 having a configuration that is integral with shaft 34 or removable such as with head 91, while the end remote from the end 32 has a nut 50 or other shaped element threadably secured to shaft 34 as necessary for the trainer to which it is mounted.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An axle arrangement for a rear hub of a bicycle, comprising:
    an axle skewer having at a first end threads formed on an outer surface thereof configured to theadably engage a frame fork of the bicycle, and at a second end remote from the first end, an enlarged head having an annular surface facing the first end; and
    an element having threads to threadably engage at the first end, and wherein each of the enlarged head and the element are configured with surfaces so as to be fixably secured to couplers of a bicycle trainer.

2. The axle arrangement of claim 1 wherein each of the enlarged head and the element have oppositely facing conical annular surfaces when the element is threaded upon the skewer, each of the conical annular surfaces having cross section therethrough reducing in a direction away from the other conical annular surface.

3. The axle arrangement of claim 1 and further comprising a spacer having an aperture through which the axle skewer slidably extends.

4. The axle arrangement of claim 1 and further comprising an adapter having an aperture through which the axle skewer slidably extends and an annular conical surface.

5. The axle arrangement of claim 4 wherein the adapter includes a flexible ring disposed about a circumferential surface of the adapter.

6. The axle arrangement of claim 1 wherein the axle skewer includes apertures extending inwardly from each of opposite end surfaces.

7. The axle arrangement of claim 6 wherein each of the apertures have internal threads.

8. The axle arrangement of claim 7 and further comprising a fastener securable to the axle skewer with the internal threads of one of the apertures.

9. The axle arrangement of claim 8 wherein the fastener comprises an adapter having surfaces configured to allow another element to be removably secured thereto.

10. The axle arrangement of claim 9 wherein the adapter includes a threaded shaft to threadably mate with the internal threads.

11. The axle arrangement of claim 8 wherein the fastener comprises a securing bolt and an adapter having a bore through which a threaded shaft of the securing bolt extends.

12. The axle arrangement of claim 1 and further comprising a fastener configured to be secured to the axle skewer, the fastener configured to attach a device to the axle skewer.

13. The axle arrangement of claim 12 wherein the fastener includes a portion having a mount for securing the device to the axle skewer.

14. The axle arrangement of claim 13 wherein the fastener includes an aperture to receive and allow the axle skewer to extend through.

15. The axle arrangement of claim 14 wherein the mount is configured asymmetrically with respect to the aperture.

16. The axle arrangement of claim 15 wherein the fastener includes a second aperture in the mount.

17. A kit comprising an axle arrangement for a rear hub of a bicycle, the kit comprising:
    an axle skewer having at a first end threads formed on an outer surface thereof configured to theadably engage a frame fork of the bicycle, and at a second end remote from the first end, and an enlarged head having an annular surface facing the first end;
    an element configured to threadably mate with the threads, wherein each of the enlarged head and the element are configured with surfaces so as to be fixably secured to couplers of a bicycle trainer; and
    two or more of a spacer and/or an adapter wherein each of said spacers and/or adapters are separately configured to adapt the axle arrangement to a different manufacturer of a bicycle.

18. The kit of claim 17 and further comprising a fastener configured to be secured to the axle skewer, the fastener configured to attach a device to the axle skewer.

19. The kit of claim 18 wherein the fastener includes a portion having a mount for securing the device to the axle skewer.

20. The kit of claim 19 wherein the fastener includes an aperture to receive and allow the axle skewer to extend through.

21. The kit of claim 20 wherein the mount is configured asymmetrically with respect to the aperture.

22. The kit of claim 21 wherein the fastener includes a second aperture in the mount.

23. The axle arrangement of claim 3 and further comprising a second spacer of length different than the spacer.

24. The axle arrangement of claim 3 and further comprising an adapter having a second aperture through which the axle skewer slidably extends and an annular conical surface.

25. The axle arrangement of claim 4 and further comprising a second adapter having a second aperture through which the axle skewer slidably extends and a second annular conical surface.

* * * * *